Patented Nov. 28, 1950

2,531,754

UNITED STATES PATENT OFFICE 2,531,754

COCCIDIOSIS CONTROL COMPOSITION

Emanuel Waletzky, Stamford, Conn., assignor to American Cyanamid Company, New York, N. Y., a corporation of Maine No Drawing. Application December 30, 1948, Serial No. 68,399

10 Claims. (Cl. 167—53.1)

This invention deals with measures for the mitigation and control of coccidiosis and more particularly with means for the administration of these measures.

Coccidiosis is a protozoan disease that affects the intestinal tract. The disease is prevalent in poultry, sheep, and calves and has its greatest effect on immature birds and mammals. It has been estimated that 12 to 20% of all chicks hatched in the United States die from cecal coccidiosis before they reach the age of one month. While not as lethal to mammals, weight loss and downgrading of the mammalian livestock, due to coccidial infection and consequent debilitation, amounts to economic losses measured in the millions of dollars annually.

It has been discovered that certain m-nitrophenylsulfides and sulfones possess a specific anticoccidial activity. These compounds are distinguished by the formula

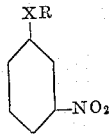

where X represents a —S— or —CO$_2$— group, R represents hydrogen, a cationic salt-forming radical, or an alkyl radical of up to about six carbon atoms.

These compounds administered to the extent of 5 to 250 milligrams per kilogram of animal weight per day preferably by way of a medicated feed, the precise dosage depending upon the particular compound and the severity of the infection, will prevent losses from coccidiosis if adminstration is started within three days of ingestion of the infective oocysts. These compounds, when administered at the requisite concentrations, show little or no toxic effects. The nutrition, rate of growth, and general well-being is not disturbed.

Concentrations of these compounds within the above range of administration, while halting the severe ravages and often fatal consequences of the disease permit mild infections, which enable the host to develop an active immunity against subsequent infection. This immunity protects the animal after the discontinuation of the medicated feed, even on heavily contaminated premises.

Test animals, which have ingested oocysts in amounts which killed more than 90% of the controls, recover and flourish if these compounds are administered up to 72 hours after infection. When the treatment has been delayed, administration should be in the range of the higher concentrations and should continue at these concentrations for at least two days. However these compounds can be most effectively administered as prophylactic long-term continuous treatments at low concentrations in the feed.

The compounds of this invention were evaluated by comparing them with sulfaguanidine, which, to date has been one of the most effective and safest medications for the control of coccidiosis. The results show that they are manyfold as effective as sulfaguanidine, and are completely safe for routine treatment, since they possess sufficient margin between therapeutic dosage and dosages which effect only slightly the rate of gain in weight of healthy animals.

The specificity of the compounds which are the subject of this invention will be apparent from a consideration of the table and discussion which follow.

Some of the compounds of the present invention which have been found effective and their approximate effectiveness as compared to sulfaguanidine are shown in the following table. These compounds were administered in various concentrations in the test ration of commercial chicken mash and the sulfaguanidine ratio was established by determining the minimum amount of the test compound which affords the same protection to the test animals as does the established dosage of sulfaguanidine, and dividing the latter by the former. In other words, a sulfaguanidine ratio of 20 indicates that .05 gram of the test compound affords the same protection to the animal as would 1.00 gram of sulfaguanidine.

Table

| Name | Sulfaguanidine Ratio |
|---|---|
| m-nitrothiophenol | 7 |
| sodium m-nitrothiophenolate | 4 |
| methyl m-nitrophenyl sulfide | 20 |
| ethyl m-nitrophenyl sulfide | 10 |
| n-amyl m-nitrophenyl sulfide | 2 |
| methyl m-nitrophenylsulfone | 15-20 |
| ethyl m-nitrophenylsulfone | 5 |

In contrast to the compounds of this invention, many closely related compounds are either inactive or toxic or both. For example, m-aminothiophenol hydrochloride and m-toluenethiol are inactive and are both toxic at dosages one-half and one-fourth the normal dosage for sulfaguanidine. Meta-dinitrobenzene is toxic even at one-twentieth of the sulfaguanidine dosage. Meta-nitrobenzenesulfonyl chloride and meta-nitrobenzenesulfonyl fluoride while not particularly toxic show no signs of anticoccidial activity at double the dosage at which sulfaguanidine is effective.

From the above, it is readily apparent that metanitrophenyl sulfides and sulfones having the general formula shown above are active against coccidiosis in contrast to other closely related compounds, which are either ineffectual, or toxic.

Although the birds or animals may be given direct individual doses of these compounds by oral administration one or more times a day, the preferred method of treatment is to allow the animal to feed ad libitum on its normal diet in which the compound is mixed. Such medicated feeds should contain enough of the drug so that the dosage range indicated above will be ingested by the animals in their normal daily diet.

The preferred manner of supplying the compounds of the present invention for administration is to thoroughly mix the anticoccidial agent in the animals' feed in the concentration ranges indicated below. The higher concentration ranges may be mixed with all or selected portions of the animals' daily rations, the concentration being so regulated that the animal will ingest daily 5 to 250 mgms. of the drug per kilogram of body weight.

In the case of chickens or other fowl, such medicated feeds should contain from about .005 to 0.2% of these compounds in the food when the treatment is of a long term nature, to protect the birds from the deleterious consequences of acute infection over long periods of time. Of course, if an infection has already been established, the concentrations of the compounds may safely range as high as 0.2% by weight of the daily total food intake. These compounds may also be supplied to the fowl by being dissolved or suspended in the drinking water or other liquid constituent of the diet such as skim milk, buttermilk, or the like.

I claim:

1. A medicated poultry and animal feed effective in the control of coccidiosis containing compounds of the general formula

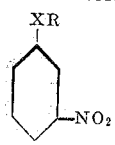

where X is chosen from the group consisting of —S— and —SO$_2$— radicals and R is chosen from the group consisting of hydrogen, cationic salt-forming radicals and alkyl radicals of up to six carbon atoms.

2. A medicated poultry and animal feed effective in the control of coccidiosis containing a compound of the general formula

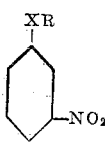

where X is chosen from the group consisting of —S— and —SO$_2$— radicals and R is chosen from the group consisting of hydrogen, cationic salt-forming radicals and alkyl radicals of up to six carbon atoms, in the concentration of at least 0.005% by weight.

3. A composition of matter for the control of coccidiosis comprising animal feed and 0.005% to 0.2% by weight of compounds of the general formula

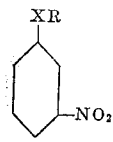

where X is chosen from the group consisting of —S— and —SO$_2$— radicals and R is chosen from the group consisting of hydrogen, cationic salt-forming radicals and alkyl radicals of up to six carbon atoms.

4. A medicated poultry and animal feed for the control of coccidiosis containing a meta-nitrophenyl sulfide in which the sulfide radical valence is substituted by a member of the group consisting of hydrogen, cationic salt-forming radicals and alkyl radicals of up to six carbon atoms.

5. An anticoccidial agent comprising animal feed and meta-nitrothiophenol.

6. An anticoccidial agent comprising animal feed and methyl meta-nitrophenyl sulfide.

7. A medicated poultry and animal feed for the control of coccidiosis containing an edible substance and a meta-nitrophenylsulfone with sulfone substituents chosen from the group consisting of hydrogen, cationic salt-forming radical and alkyl radicals of up to six carbon atoms.

8. An anticoccidial agent comprising animal feed and methyl-meta-nitrophenylsulfone.

9. An anticoccidial agent comprising animal feed and sodium meta-nitrothiophenolate.

10. An anticoccidial agent comprising animal feed and ethyl meta-nitrothiophenolate.

EMANUEL WALETZKY.

REFERENCES CITED

The following references are of record in the file of this patent:

UNITED STATES PATENTS

| Number | Name | Date |
| --- | --- | --- |
| 2,279,421 | Tisdale | Apr. 14, 1942 |

OTHER REFERENCES

Twist, Journal of the Chemical Society, vol. 127 (1925), pages 1248–1252.

Brand, Chemical Abstracts, vol. 31 (1937), page 3461.